(12) United States Patent
Jones et al.

(10) Patent No.: US 7,326,489 B2
(45) Date of Patent: Feb. 5, 2008

(54) CATALYST DESIGN FOR VRLA BATTERIES

(75) Inventors: William E. M. Jones, Freeport (BS); Harold A Vanasse, West Chester, PA (US)

(73) Assignee: Philadelphia Scientific, Montgomeryville, PA (US)

( * ) Notice: Subject to any disclaimer, the term of this patent is extended or adjusted under 35 U.S.C. 154(b) by 105 days.

(21) Appl. No.: 10/337,041

(22) Filed: Jan. 6, 2003

(65) Prior Publication Data

US 2003/0113612 A1 Jun. 19, 2003

Related U.S. Application Data

(63) Continuation of application No. 09/461,552, filed on Dec. 14, 1999, now Pat. No. 6,660,425.

(60) Provisional application No. 60/112,305, filed on Dec. 14, 1998, provisional application No. 60/113,579, filed on Dec. 24, 1998, provisional application No. 60/148,536, filed on Aug. 12, 1999.

(51) Int. Cl.
*H01M 10/52* (2006.01)
*H01M 2/12* (2006.01)

(52) U.S. Cl. .............................. 429/53; 429/57; 429/86

(58) Field of Classification Search ...................... None
See application file for complete search history.

(56) References Cited

U.S. PATENT DOCUMENTS 3,832,238 A * 8/1974 Marui et al. ................... 429/86
3,929,422 A   12/1975 Kreidl et al. ................. 23/288
3,930,890 A    1/1976 Dietz .......................... 136/179

(Continued)

FOREIGN PATENT DOCUMENTS

DE          29 04 842         8/1980

(Continued)

OTHER PUBLICATIONS

Letter from C. Quinn of Dann Dorfman Herrell and Skillman (Jul. 22, 1998).

(Continued)

*Primary Examiner*—John S. Maples
(74) *Attorney, Agent, or Firm*—Synnestvedt & Lechner LLP

(57) ABSTRACT

A catalyst device for use with battery cells to recombine oxygen and hydrogen gas and thereby improve the performance and life of such cells. The catalyst device has the ability to filter out catalyst poisons and control the temperature of the recombination reactions. A container houses the catalyst within a chamber. A catalyst poison filter is provided in the chamber with the catalyst. The movement of gas and vapor to and from the chamber is controlled by a microporous section of the device. The pore size is chosen to allow gas and vapor to pass, but not liquids, and to also prevent a flame from passing through. Within these parameters the pore size can also be chosen to control and or limit the amount of gas that can pass through to the catalyst in a given time period. Preferably, the microporous section is formed as a disc that seals an opening in the chamber. The filter material is then placed as a layer between the catalyst and the opening such that the poison in the gas must pass through the filter material before reaching the catalyst.

20 Claims, 10 Drawing Sheets

U.S. PATENT DOCUMENTS

| | | | |
|---|---|---|---|
| 4,002,496 A | 1/1977 | Nitta et al. | 429/53 |
| 4,048,387 A | 9/1977 | Lahme et al. | 429/50 |
| 4,098,964 A | 7/1978 | Reber | 429/86 |
| 4,374,907 A | 2/1983 | Chuang et al. | 429/57 |
| 4,394,423 A | 7/1983 | Ledjeff | 429/86 |
| 4,400,450 A | 8/1983 | Wagner | 429/86 |
| 4,497,880 A | 2/1985 | Kraft et al. | 429/86 |
| 5,132,175 A | 7/1992 | Mrotek et al. | 429/86 |
| 6,254,841 B1 | 7/2001 | Kesper et al. | 422/211 |
| 6,294,282 B1 | 9/2001 | Misra et al. | 429/54 |
| 6,432,582 B1 | 8/2002 | Holden et al. | 429/225 |
| 2002/0061434 A1 | 5/2002 | Holden et al. | 429/54 |

FOREIGN PATENT DOCUMENTS

| | | |
|---|---|---|
| EP | 0 952 619 | 4/1998 |
| GB | 693096 | 6/1953 |
| WO | WO 97/15958 | 5/1997 |
| WO | WO 98/21766 | 5/1998 |

OTHER PUBLICATIONS

Berndt, D., "Maintenance-Free Batteries, Lead-Acid, Nickel/Cadmium, Nickel/Hydride," Research Studies Press Ltd., (1993), pp. 131-133, 180-183 and 259-260, no month.

Hydro-Catylators, "Link Chemistry to Industry, Promote Safety, Reduct Maintenance Costs," (May 1961).

* cited by examiner

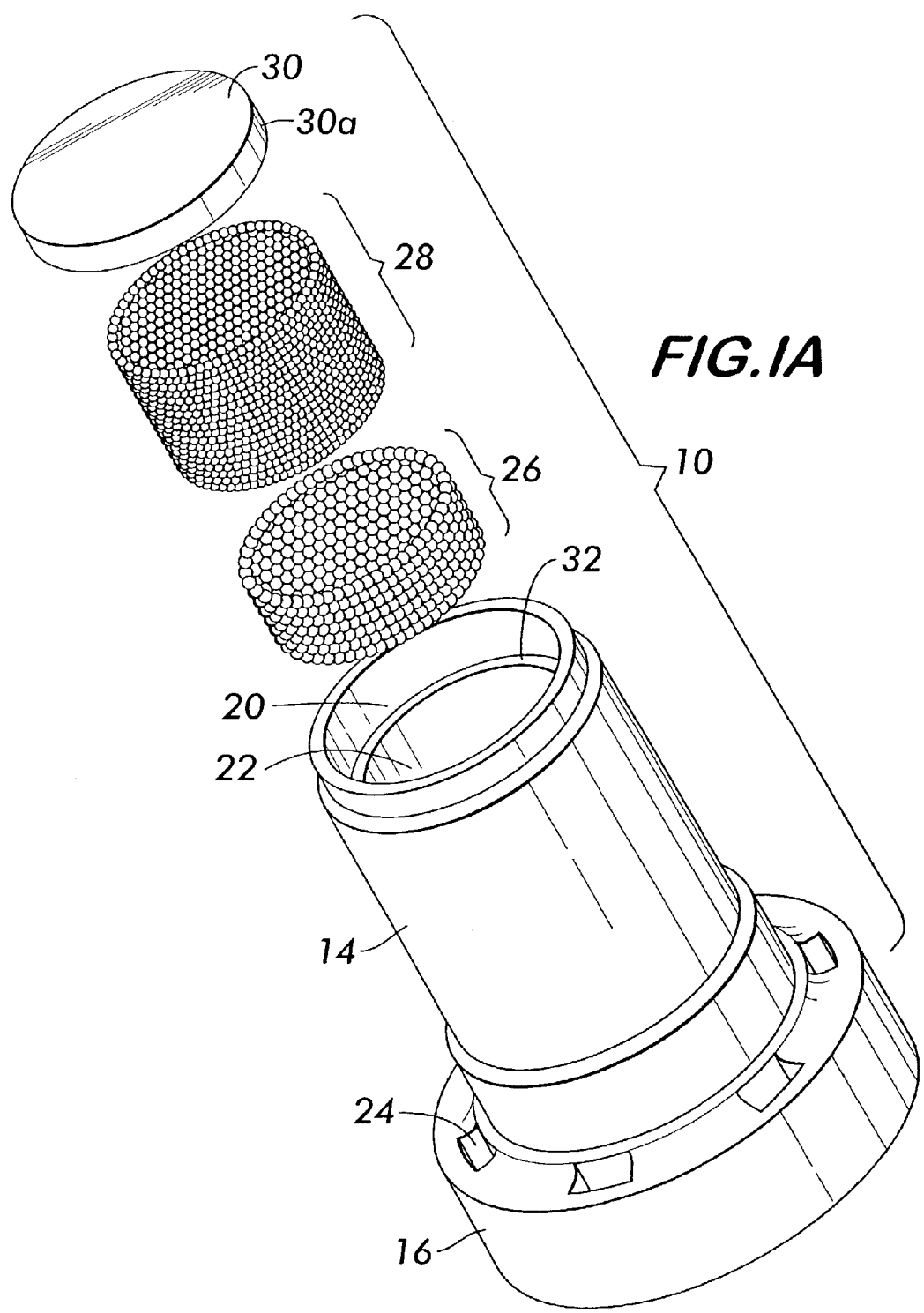

CATALYST DESIGN FOR VRLA BATTERIES

CROSS REFERENCE TO RELATED APPLICATION

This application is a continuation of U.S. application Ser. No. 09/461,552 filed Dec. 14, 1999, which issued as U.S. Pat. No. 6,660,425, and which claims the benefit of U.S. Provisional Applications Nos. 60/112,305 filed Dec. 14, 1998, 60/113,579 filed Dec. 24, 1998, and 60/148,536 filed Aug. 12, 1999, all of which are hereby incorporated by reference.

BACKGROUND

1. Field of the Invention

The present invention relates to the use of catalysts for improving the service life of valve regulated lead acid (VRLA) cells, and to a catalyst device which may also be applicable to other types of batteries where it is desirable to recombine excess oxygen with hydrogen produced in the battery cell. More particularly, the present invention relates to improved catalyst devices that minimize catalyst poisoning and control the temperature of the catalytic reaction.

2. Background of the Invention

Significant improvements to VRLA battery cells can be made with the addition of a catalyst for recombining oxygen and hydrogen gasses within the cells as disclosed in U.S. application Ser. No. 09/022,336 filed Feb. 11, 1998, and which is hereby incorporated by reference (see related PCT publication WO 99/41798). One preferred method of adding catalyst to VRLA cells is to couple the catalyst with the pressure relief valve, sometimes referred to as a pressure relief vent or pressure relief vent cap, which provides a convenient means of retrofitting existing cells as well adding catalyst to new cells. A novel catalyst device for use with pressure relief vents is disclosed in U.S. application Ser. No. 09/022,336. While the addition of catalyst provides significant improvement in the performance and of life of VRLA cells, additional improvements to the catalyst itself, particularly with the structures and devices that support or house the catalyst, are believed necessary to gain the full benefits of the catalyst.

High rates of gassing in VRLA battery cells can be caused by conditions such as thermal runaway, malfunctioning power rectifiers, boost charging, charging at abnormally high rates of voltage, and other reasons known in the art. In lead-acid battery cells, oxygen and hydrogen gas is generated due to the electrolysis of water. If a catalyst were installed in a cell experiencing a high rate of gas production, the catalyst would catalyze the oxygen and hydrogen to water in a highly exothermic reaction. The resulting enthalpy could generate enough heat to melt many commonly used plastic materials that compose the battery cover, jar or vent cap assemblies. This high reaction temperature can also limit the materials that can be used to house the active catalytic material.

One catalyst device as described in the above referenced U.S. application Ser. No. 09/022,336 patent application, uses a porous ceramic cartridge to house the catalytic active material. This porous cartridge allows gas to enter the chamber and water vapor to exit the chamber, and prevents the passing of a flame from inside the chamber to outside the chamber if one were to develop due to ignition of the gases. The temperature achieved, as a result of the exothermic reaction, is governed mainly by the amount of gas produced by the battery. In the normal functioning of a VRLA battery, the temperature of reaction is generally not more than 5° to 10° F. above ambient temperature. However, in the case of high rates of gassing, a higher than normal temperature could occur which could lead to melting of the plastic that supports the catalyst cartridge, that composes the vent cap or that composes the cell jar or cell cover. The high temperature could also deform the pressure relief valve that is present in the vent cap for these VRLA cells. A deformed pressure relief valve will change the operating characteristics of the cell. Temperature high enough to melt the plastics used to compose batteries must be avoided.

Another problem found to plague lead acid cells is catalyst poisoning. Precious metal catalysts, such as palladium and platinum are susceptible to poisoning by many chemicals that can limit and negate the effectiveness of the catalysts. Catalyst poisons can be generated in or found in the battery cells. VRLA batteries are constructed of materials that may exhaust gaseous compounds that are poisonous to catalysts. Such poisons include organic compounds such as phthalates used as a plasticizer in PVC battery jars and covers, and inorganic compounds such as sulfides, mercaptins, amines, stibine and phosphates whose base chemicals can exist as an impurity in battery plates and exhaust as the plates corrode. Amines and mercaptins are used extensively as curing compounds in multi-part epoxies which are used in the manufacture of cells by many manufacturers. It is also believed that localized areas of high current densities may cause hydrogen sulfide to form within the cells. Hydrogen sulfide may also be a byproduct of the dry charging process that traps sulfur species in the plates which is then released early in the battery's life. It is believed that compounds such as those described above that have a (−2) state of charge can bond with catalyst activation sites rendering the catalyst effective. The catalyst can also be poisoned by large chain molecules, such as phthalates, that coat the catalyst substrate and then solidifying on it, creating a barrier that prevent the gasses from reaching the catalyst reaction sites. Hydrogen sulfide, $SO_x$ species, and other sulfides will also poison precious metal catalysts.

It is further believed that simpler and lower cost catalyst devices are desirable.

Accordingly, one object of the present invention is to limit the temperature of the catalytic reaction.

Another object of the present invention is to prevent poisoning of the catalyst.

Another object is to lower the manufacturing costs of catalyst devices.

SUMMARY OF THE INVENTION

In accordance with the present invention there is provided a device for combining oxygen and hydrogen gases within a battery cell. The device has a container which has a chamber. Arranged within the chamber is a catalyst capable of combining oxygen and hydrogen gases to form water vapor. The device includes a microporous section having pores through which gases in the battery cell can pass into the chamber to the catalyst. A catalyst poison filter is arranged in the device to remove at least some of the catalyst poisons in the gas passing through the filter to the catalyst.

The pore size and developed surface area can be chosen to control the temperature of the catalytic reaction by controlling the amount of gas that can pass through to the catalyst at any given time.

The container is preferably made of a non-porous plastic material and has an opening to the chamber. Sealing the opening is the microporous section formed as a microporous member. The filter material here is ideally placed in the chamber between the catalyst and the microporous member. This forces the gas entering the chamber through the microporous member to pass first through the filter before reaching the catalyst and thereby maximizes the effectiveness of the filter. This design presents an embodiment that combines both poison filtering and temperature control in one easy to manufacture, low cost and inherently safe to the cell design. It operates on the principle that the heat of reaction, of the catalyst, can be controlled by limiting the amount of oxygen and hydrogen gas that is exposed to the catalyst. This control is accomplished by selecting the proper pore size, developed and planar surface area, and/or wall thickness of the area that the hydrogen and oxygen pass through in the container that houses the catalyst. This area is created from a porous high temperature acid resistant plastic material that has inherent hydrophobic properties with a porosity that is small enough to not allow a hydrogen flame front to pass through (Anti-Flame Protection). The hydrogen and oxygen gasses will then pass through the filter bed that will remove any catalyst poisons before they reach the active material.

Other embodiments of the invention are also provided such as providing the microporous section in the container wall.

BRIEF DESCRIPTION OF THE DRAWINGS

FIG. 1A is an exploded view of the device of FIG. 1;

DETAILED DESCRIPTION OF THE INVENTION

Figure 1:
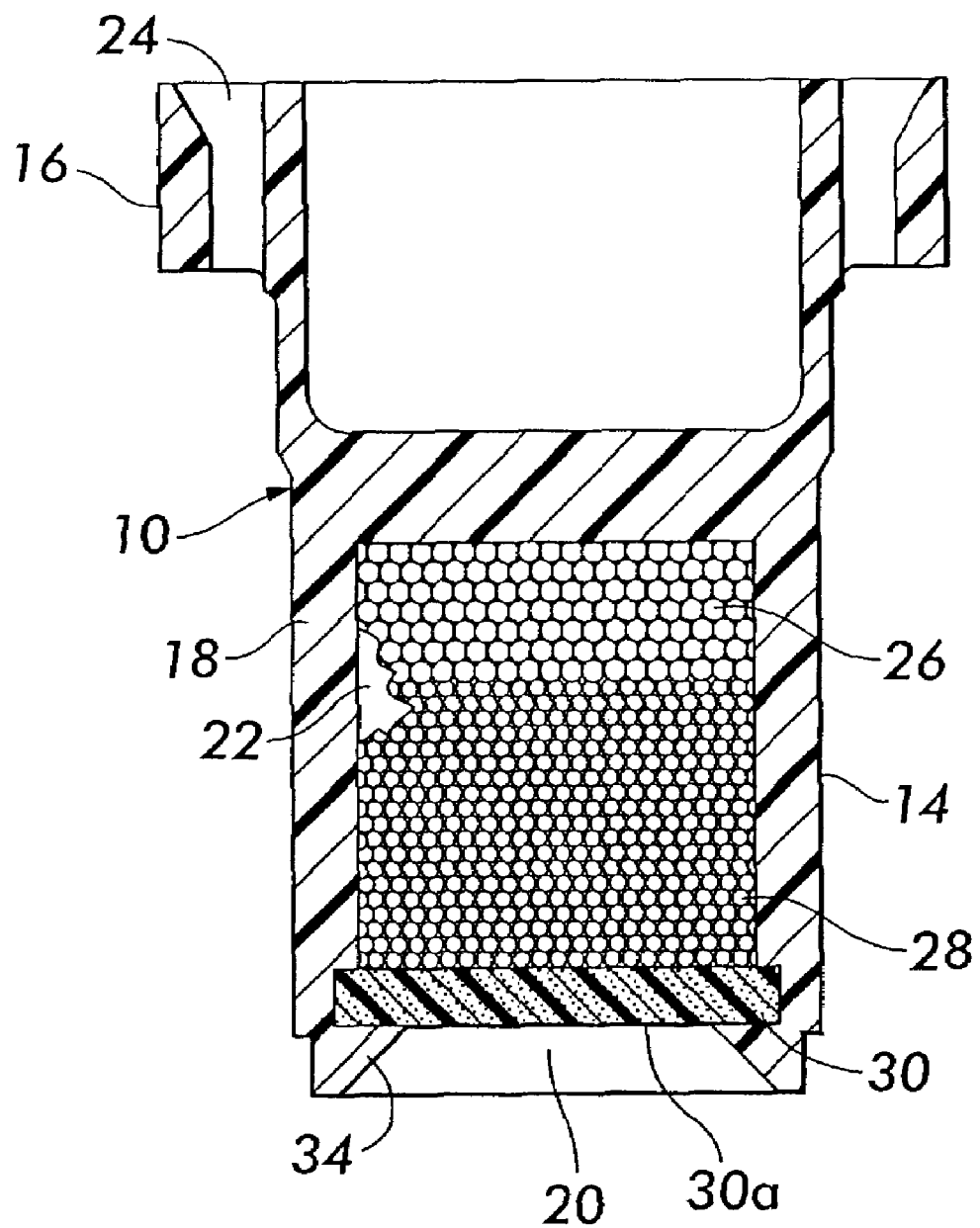
FIG. 1 is a cross sectional view of a device in accordance with the present invention having a flange.
Figure 1B:
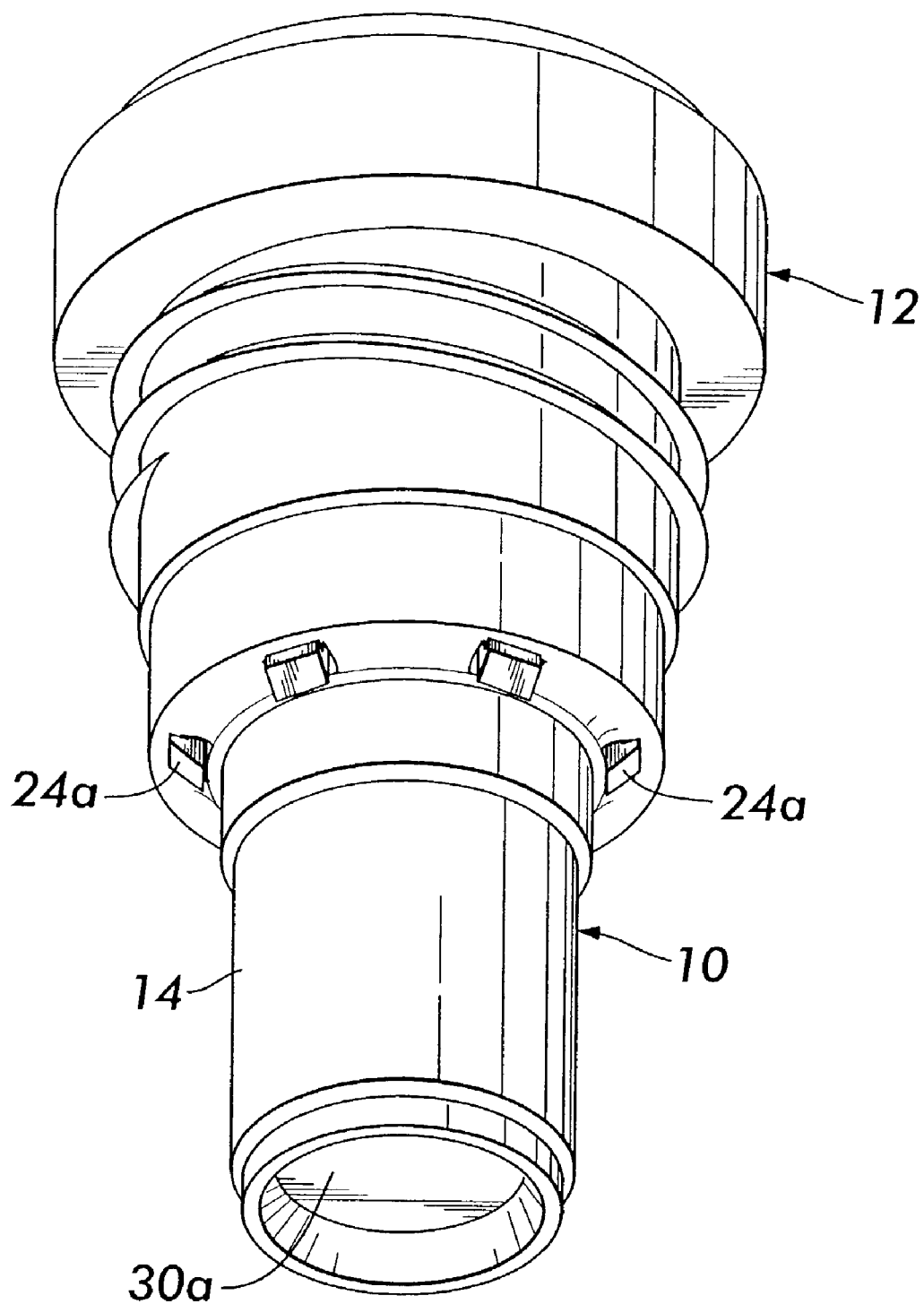
FIG. 1B is perspective view of the device of FIG. 1 attached to a pressure relief valve.

With reference to FIGS. 1, 1A and 1B, a catalyst device 10 is configured for attachment to a pressure relief vent 12 (FIG. 1B) of the type used with VRLA battery cells. The device 10 has a cylindrically shaped container 14 and is attached to an integral flange 16. The container 14 has a wall 18 defining an internal chamber 22. An opening 20 at an end of the container 14 permits access to the chamber 22 as described below. The container 14 is preferably made of high temperature plastic material resistant to sulfuric acid and suitable for the internal environment of a battery cell. The container material of this embodiment should also be impermeable to liquids and gases so that the gases can enter the chamber 22 only through the opening 20. Put another way, all fluid communication between the catalyst within the internal chamber 22 and the outside of the container 14 (the internal environment of the battery), be it gas or liquid, is through the opening 20. A preferred material is Questra® made by Dow Chemical.

The flange 16 is integral to the container 14 and configured to fit a particular pressure relief valve 12. For pressure relief valves of other manufacturers, a flange configured specifically for the particular valve is readily provided by changing the mold insert in conjunction with the mold for the container 14. Here, the flange is configured to snap to the pressure relief valve 12 as shown in FIG. 1B, the flange having holes 24 (FIGS. 1 and 1A) for receiving snap pins 24a of the valve 12. Means of attachment other than a snap type connection may be used. For example, the pins 24a could be non-snap type pins that are inserted into the holes 24 of the flange, and then the ends of the pins 24a are melted by means such as heat staking or ultra sonic means to fix the container 14 to the pressure relief valve 12.

The chamber 22 contains a catalyst 26 for combining oxygen gas and hydrogen gas. Precious metal catalyst such a palladium and platinum may be used, a catalyst 26 of one-half percent palladium impregnated on an activated carbon substrate being preferred for the illustrated embodiment. It is understood that the uniform spheres representing the catalyst 26 as shown in the drawings are for illustrative purposes, the catalyst capable of being provided in many forms such as granules or fine powder.

Positioned between the catalyst 26 and the chamber opening 20, is a poison filter 28 for removing compounds that are poisonous to the catalyst. Suitable filter materials for the type of poisons found in VRLA cells include activated carbon, potassium carbonate ($K_2CO_3$), metals such a nickel, ruthenium, copper, and metal salts. A combination of multiple filter materials are preferred as some filter materials have a higher affinity or are more specific to particular poisons. In the illustrated embodiment, a multiple filter bed of 325 mesh activated carbon impregnated with 20% $K_2CO_3$ is preferred.

For poisons that are basic, the filter materials can be treated by soaking with ⅒ molar HCL (hydrochloric acid) then drying at 180° F. for 24 hours to create an acidic filter having a strong affinity to react with basic poisons. For acidic poisons, the filter materials can be treated by soaking with a 5% sodium bicarbonate and water solution then drying at 180° F. for 24 hours to create an alkaline filter that will have a stronger affinity to react with acidic poisons.

The device 10 has a micro-porous section 30 through which the gas and vapor can pass between the chamber 22 and the environment outside the device 10 (the internal environment of the battery cell). In the present embodiment the microporous section 30 takes the form of disk shaped microporous member 30a covering the opening 20 as shown which is fixed on a shoulder 32 formed in the container 14. The microporous disk member 30a is heat sealed or ultrasonically welded in place—see the angled edge 34 in FIG. 1 where the container was melted as part of the welding or heat staking process. The microporous member 30 is made of a porous material, preferably plastic, such as PVDF (polyvinylidene fluoride), PTFE (polytetrafluoroethylene) or polypropylene, and which is preferably hydrophobic in nature to water and the electrolyte (sulfuric acid in lead acid cells) in the battery cell. The pore size is such that only gas or vapor can pass through, but liquid will not. Likewise, the microporous section 30 should have a pore size small enough to not allow a hydrogen flame front to pass through. When the microporous member 30a is sealed in place in the opening 10, the catalyst 26 is completely sealed within the chamber 22 such that gas or vapor can pass between the chamber 22 and the environment outside the device 10 only by passing through the pores of the microporous section 30 (disc 30a).

The benefit of positioning the filter 28 between the catalyst 26 and microporous disk member 30a is readily seen. Gases entering the chamber 22, which may include compounds poisonous to the catalyst, reach the catalyst only after passing through the filter 28. It is possible to provide a mixture of the catalyst and filter within the chamber 22 rather than the stratified layers shown. Some poisons, however, have a stronger affinity for the catalyst than the filter material, and, where the filter material and catalyst are near each other, may go to and poison the catalyst rather than to the filter. The illustrated embodiment avoids this problem by forcing the poison first through the filter.

The present invention also permits control of the heat of reaction in the catalyst by limiting the amount of oxygen and hydrogen gas that is exposed to the catalyst 26. As previously discussed, the pore size in the microporous section 30 is chosen such that only gas or vapor is capable of passing through, and to also act as an anti-flame barrier. Additionally, in conjunction with other variables such as the planar surface area and the thickness of the microporous member 30a, the pore size ultimately selected controls the amount or rate of gas that can pass into the chamber 22 and subsequently be exposed to the catalyst 26. This exposure determines the heat of reaction that is generated by the catalyst action of combining the oxygen and the hydrogen gases into water. Pore sizes that are known to work as a method of temperature control are, but not limited to, 1 to 40 microns. Varying the thickness of the microporous member 30 in conjunction with selecting pore size can also be used to control temperature.

In the illustrated embodiment of FIGS. 1, 1A, and 1B, a preferred configuration has a cylindrical chamber 22 having a volume of approximately 0.35 cubic inches (with internal diameter of 0.45 inches). The volume of catalyst 26 (½% palladium on an activated carbon substrate) is about 0.12 cubic inches; the volume of filter material 28 (325 mesh activated carbon impregnated with 20% $K_2CO_3$) is about 0.23 cubic inches. The catalyst 26 and filter 28 materials completely fill the chamber 22 and are held tightly within by the microporous disk 30a so that there is minimal movement and mixing of the materials even if the device 10 is shaken. It is seen that this embodiment has a ratio of 1/3 catalyst to 2/3 filter material by volume.

The disk-shaped microporous member 30 is formed of PTFE, ⅛" inch thick, ½ inch diameter, and having a 25 micron pore size. This configuration provides a device 10 rated for about 1 Amp Faraday: 11-12 ml/minutes at standard temperature and pressure of 2 parts $H_2$ and 1 part $O_2$ passing through to the catalyst, and which generate a temperature in the range of 120° F. to 140° F. at these conditions.

In addition to providing temperature and poison control, the present invention also provides a simpler design over previous designs. One previous design uses a porous ceramic chamber that provided anti-flame protection and which is externally wrapped with a hydrophobic PTFE film to protect the internal catalyst from liquid. The PTFE film has a specific porosity that allows hydrogen, oxygen and gaseous water to pass through, but does not allow any liquids to contact the catalyst. The present invention uses technology (the micro-porous section 30) that is inherently hydrophobic, anti-flame preventing, and microporous thus eliminating the need for the film and ceramic chamber while still serving the same functions. This results in a simpler and lower cost design.

Figure 2:
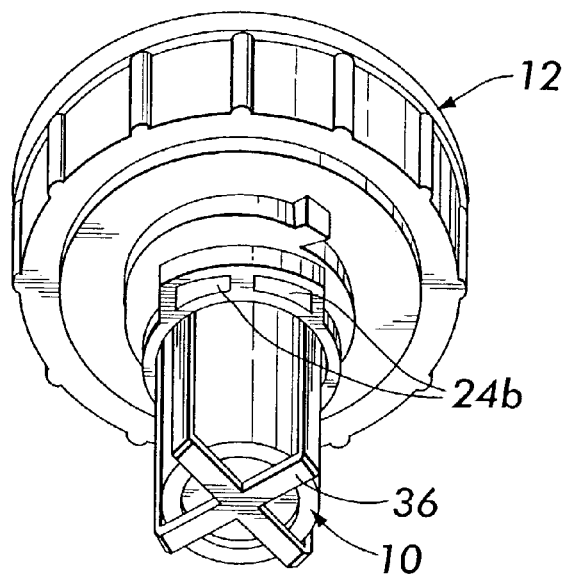
FIG. 2 is a perspective view of a flangless catalyst device held to a pressure relief valve by a holder.
Figure 2A:
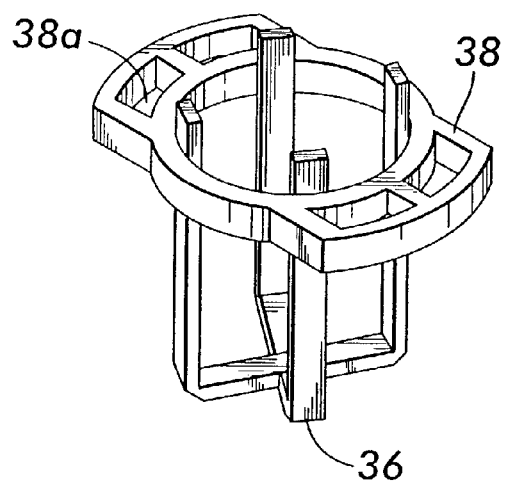
FIG. 2A is a perspective view of the holder of FIG. 2.
Figure 2B:
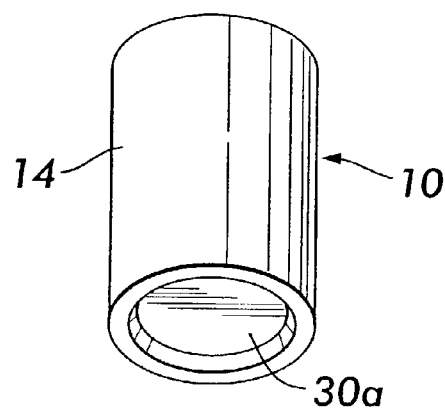
FIG. 2B is a perspective view of the catalyst device of FIG. 2.

The present invention is also adaptable to the many different battery cells and pressure relief valves of the different manufacturers. As previously discussed, the flange 16 is formed to specifically fit the valve 12 shown in FIG. 1B. The basic container 14 can be standardized and produced with a mold designed to accept inserts for creating flanges configured to fit vents made by other manufacturers. If desired, no flange need be added, the container being retained to the valve by some other means. For example, a device 10 having a cylindrical container 14 similar to that shown in FIG. 1 but without the flange 16 is shown in FIG. 2B. The flangeless device 10, as shown in FIG. 2, is held to the valve 12 of another manufacturer by a holder 36, here a cage type holder as shown in FIG. 2A. The cage holder itself has a flange 38 for attaching to the valve 12, the pins 24b of the valve 12 being inserted in the holes 38a and melted to fix the cage 36, with the catalyst device 10 inserted within the cage 36, to the valve 12.

Figure 3:
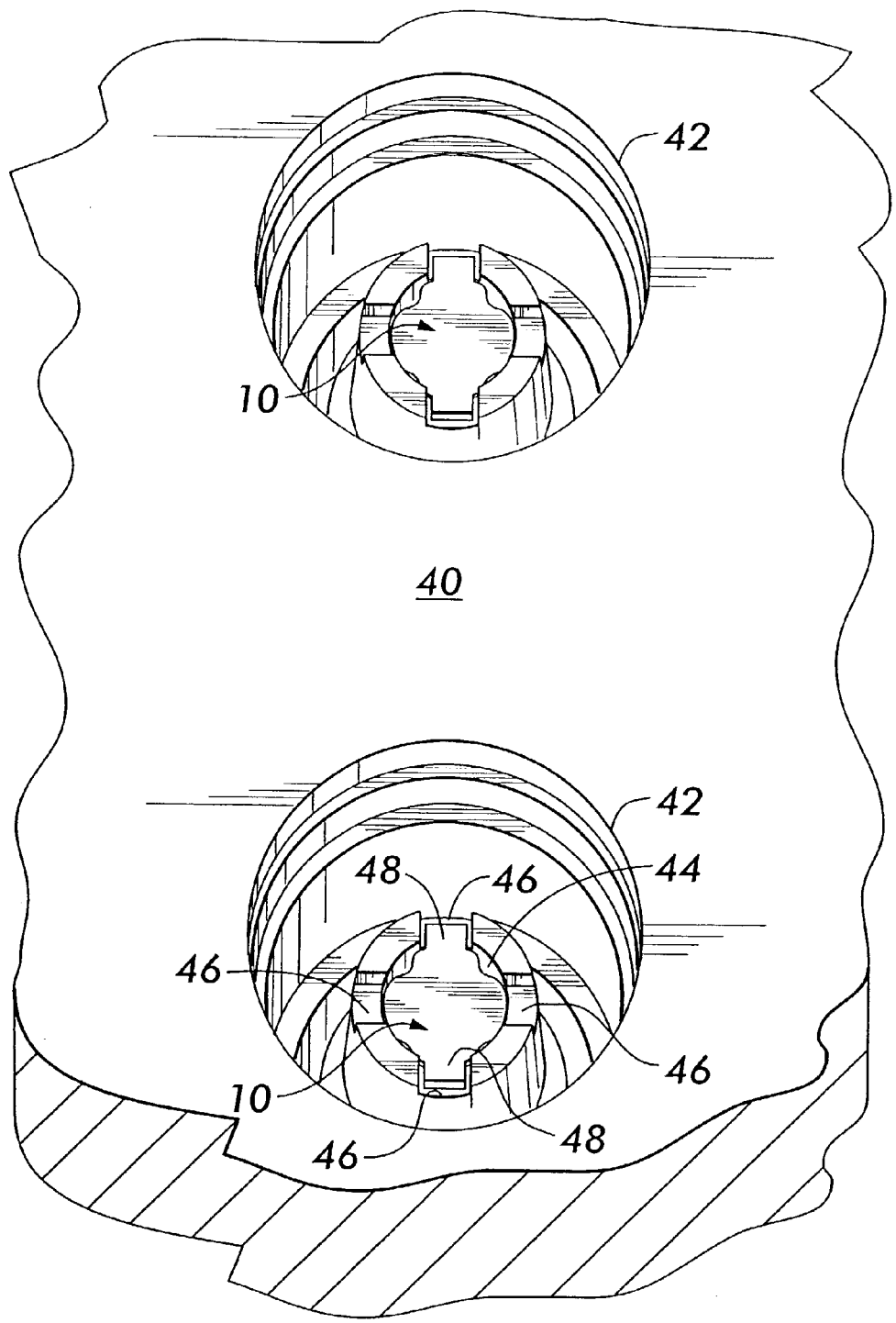
FIG. 3 is a top perspective view of a vent boss of a Monoblock type battery cell showing the top of a ¼ amp embodiment of the invention installed in the vent opening.
Figure 3A:
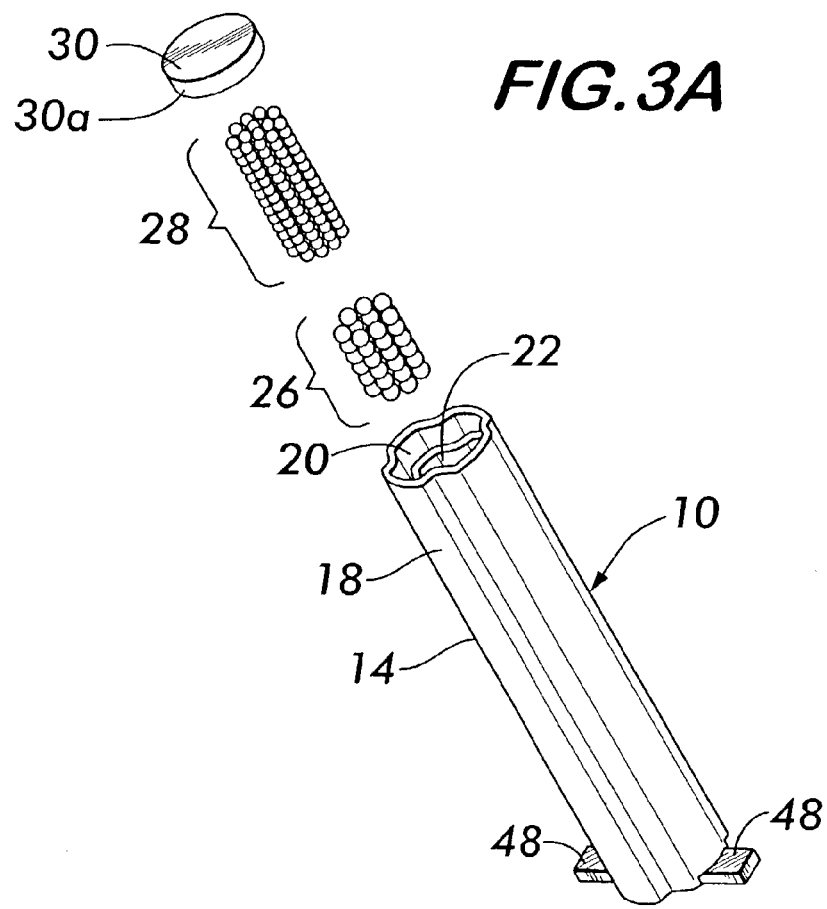
FIG. 3A is an exploded view of the ¼ amp device of FIG. 3.

For some battery designs it is not possible to attach the catalyst device to the pressure relief valve. Illustrated in FIG. 3 is the top view of a jar cover 40 for Monoblock type battery cells that have a vent boss 42 into which a pressure relief valve fits. The vent boss of this particular example has an opening 44 which has about a 6 mm diameter, and four recesses 46 around the opening 44. Other vent bosses of other manufacturers may have openings 44 of a different diameter. Shown in FIG. 3A is a smaller version of the catalyst device 10 having a diameter (width) no larger than the vent opening, in this example about 6 mm, for fitting in the opening 44 of the vent boss 42. The container 14 has a non-porous wall 18 and an opening 20 into the chamber 22. In the chamber 22 is a layer of catalyst 26, a layer of filter 28, all of which is sealed from the environment of the battery cell by the micro porous section 30 which is formed as a small micro porous disk member 30a. Two tabs 48 integrally connected to the container 14 extend therefrom for fitting into the recesses 46 of the boss 42 and holding the device 10 in place when installed in the opening 44 as seen in FIG. 3.

The configuration shown in FIGS. 3 and 3A is rated at about ¼ Amp, the chamber 22 having a volume of about 0.02 cubic inches, ⅓ to ½ of which is filled with catalyst 26, the rest with filter material 28. The micro porous disk member 30a being a PTFE disk of roughly 0.02 inches square surface area, ⅛ inches thick, and a pore size of 25 microns allowing 3-6 ml/minutes at standard temperature and pressure of 2 parts $H_2$ and 1 part $O_2$ passing through to the catalyst.

Another option would be to simply drop the catalyst device 10 into a battery cell. A configuration suitable for doing so is shown if FIG. 4. Here the device 10 has a container 14 similar to that of FIG. 1 formed with a series of legs 50 which extend beyond the top end 51 of the container which has the micro porous disk member 30a so that no matter how the device 10 lands within the battery cell, the micro porous member 30a will not sit flat against any object which may block the flow of gas.

With VRLA cells of the Gel type, spitting action within the cell may coat the micro-porous member 30a with gel and block the gas access to the catalyst depending on how the device 10 is positioned. A shield could be attached as a separate piece or could be part of the molded container itself to protect the porous hydrophobic disk and the catalyst active material from the spitting silica and silica gel. With non Gel cells such as AGM and liquid electrolyte cells, this should not be a problem.

The catalyst cartridge assembly 10 can be made to have a self-shutdown mode. If the heat of reaction reaches the melting temperature of the plastic used to house the active material, it will melt and physically cover the active material. This physical covering of the active material will block precious metal activation sites, rendering the catalyst ineffective and shutdown the reaction.

It is seen that the use of catalyst is made safer from the viewpoint that by limiting the temperature of the reaction there is no way that a catalyst of this design could possibly damage the cell, even if the cell is in a high gassing situation such as boost charge, or a cell failure mode. The catalyst is designed to bypass excess gas if the cell is creating more gas than the catalyst has been designed to recombine. This reaction limitation is controlled by the porous section 30 which has a predetermined gas flow rate limit.

Thus, the present invention can be attached directly to low temperature plastic materials such as polypropylene, ABS and other materials commonly used in batteries. This catalyst can be attached directly to vent caps, or other components of the battery.

Another alternative embodiment of the present invention is now described with reference to the device 10 of FIG. 5. Unlike the previous embodiment, here, the porous section 30 is in the container wall 18. The device 10 has a cylindrical container 14 having a container wall 18 and defining a chamber 22. An opening 20 provides access to the chamber for adding the catalyst 26. The porous section 30 is provided in at least a section of the wall 18 of the container 14, here the entire wall structure 18 being porous. The container 14 is made of a porous plastic material such as PVDF, Teflon, or Polypropylene. The opening 20 is sealed with a nonporous plug 52 so that the gas or vapor can pass only through the pores in the wall 18. Like the embodiment discussed above, the pore size of the porous section, here the wall 18, is chosen to allow gas to pass, but not liquid, and to prevent a flame front from passing through. Within these parameters, the pore size can be varied to control the amount or rate of gas that can pass through the chamber walls and subsequently be exposed to the catalyst active material, i.e., temperature control. Pore sizes for temperature control are preferably between 1 and 40 microns. Varying the wall thickness of the container in conjunction with the pore size and surface area of the container can also be used to control temperature.

The non porous plug 52 is preferably made of an epoxy that does not itself exhaust catalyst poisons and which is suitable for the environment in battery cells. Such materials include acrylic based compounds such as Loctite Material 3345 which are cured by Ultra Violet radiation for 15 seconds, or silicon based compounds such as Loctite Material 5091 partially cured by UV for 30 seconds and followed by a secondary moisture cure. A wadding of fiber glass material acts as a dam between the catalyst 26 and the plug 52 when the plug is first poured.

Figure 4:
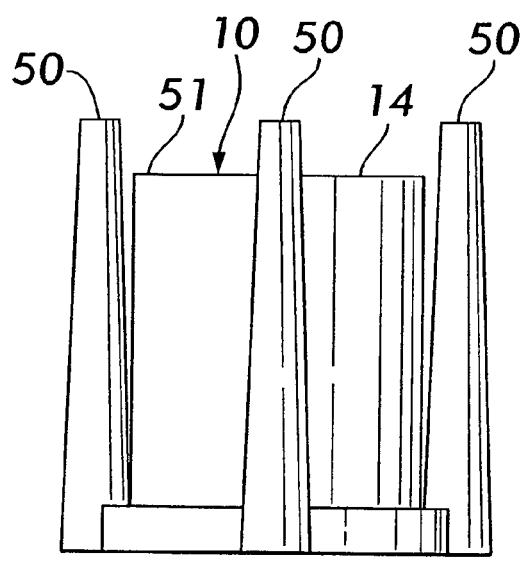
FIG. 4 is a frontal view of another embodiment of the catalyst device.

A thermal mass material 54 may be added with or without temperature control sized pores to also help control temperature. As seen in FIG. 4, the catalyst 26 is mixed with the thermal mass material 54 which can be made of a powder of a ceramic material or a plastic material (e.g., polypropylene, acrylic) or a metal (e.g., aluminum, copper, brass). It is believed that the powdered material should be of a size that is less than or equal to the size of the catalyst material, and that there be about 2 parts thermal mass material to 1 part catalyst material. This design is believed to work by increasing the thermal mass of the chamber, in other words, by spreading the heat of reaction over a larger mass.

Figure 5:
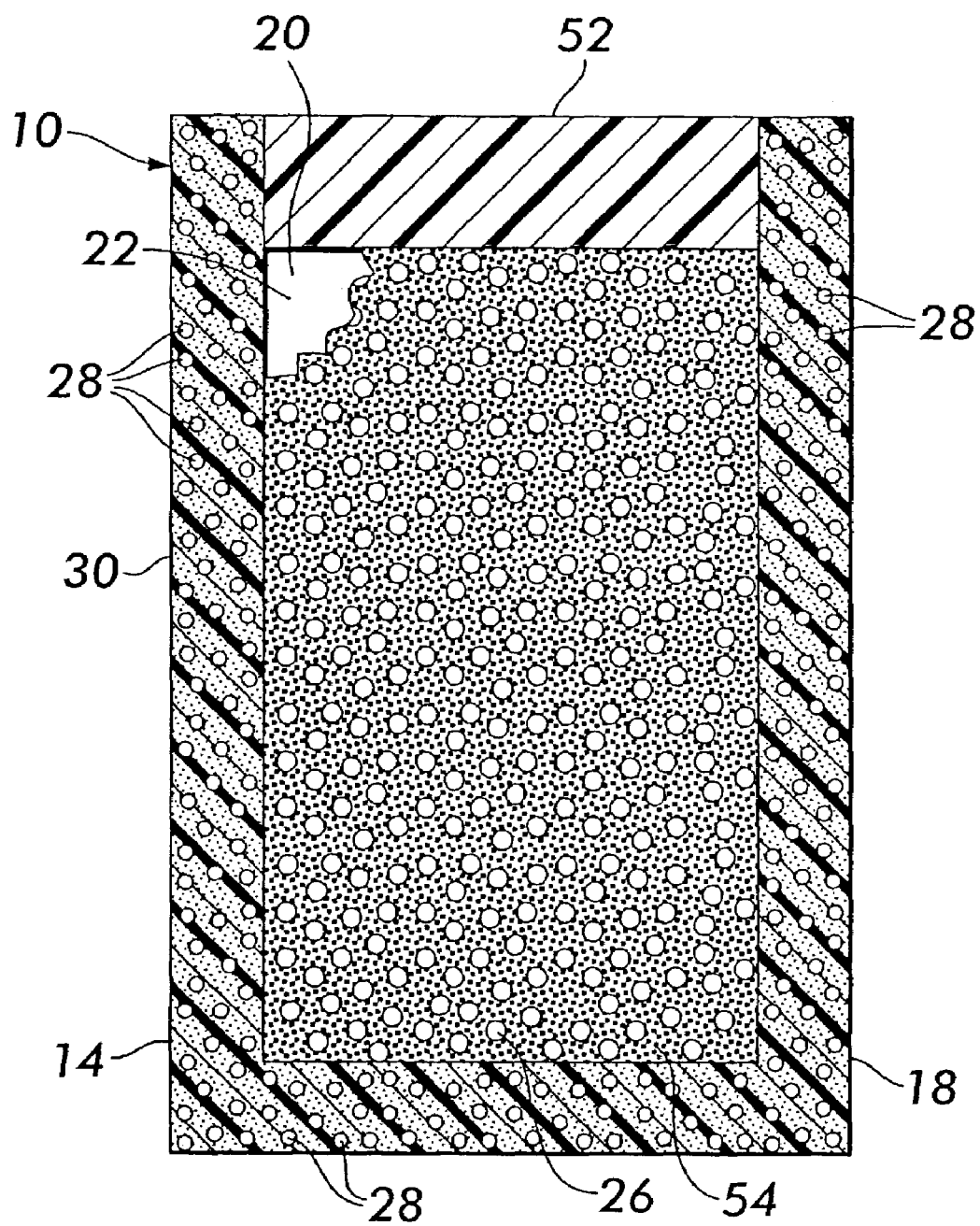
FIG. 5 is a cross sectional view of another embodiment of the present invention.

Catalyst poison filter material 28 can also be added to the device 10 of the type shown in FIG. 5. One possibility is to add filter material directly to the plastic material of the container 14. Filter material 28 such as activated carbon can be impregnated into the plastic of the container 14 during the molding process. One way of doing this is to mix the powders of the plastic and the filter materials 28 and then mold the mixture to form the container 14. Pores of the desired size are also added. One example is a mixture of 80% PVDF and 20% activated carbon with $K_2CO_3$. The addition of the filter material, however, may lesson the hydrophobic nature of the container. A porous PTFE film wrap around the container 14 as disclosed in U.S. application Ser. No. 09/022,336 could be added if desired to increase the hydrophobic nature.

Another possibility (not shown in FIG. 5) is to mix the filter material 28 with the catalyst 26 in the chamber 22. As discussed above, however, where poisons are not forced first through a filter, poisons that have a high affinity for the catalyst may still poison the catalyst.

Figure 6:
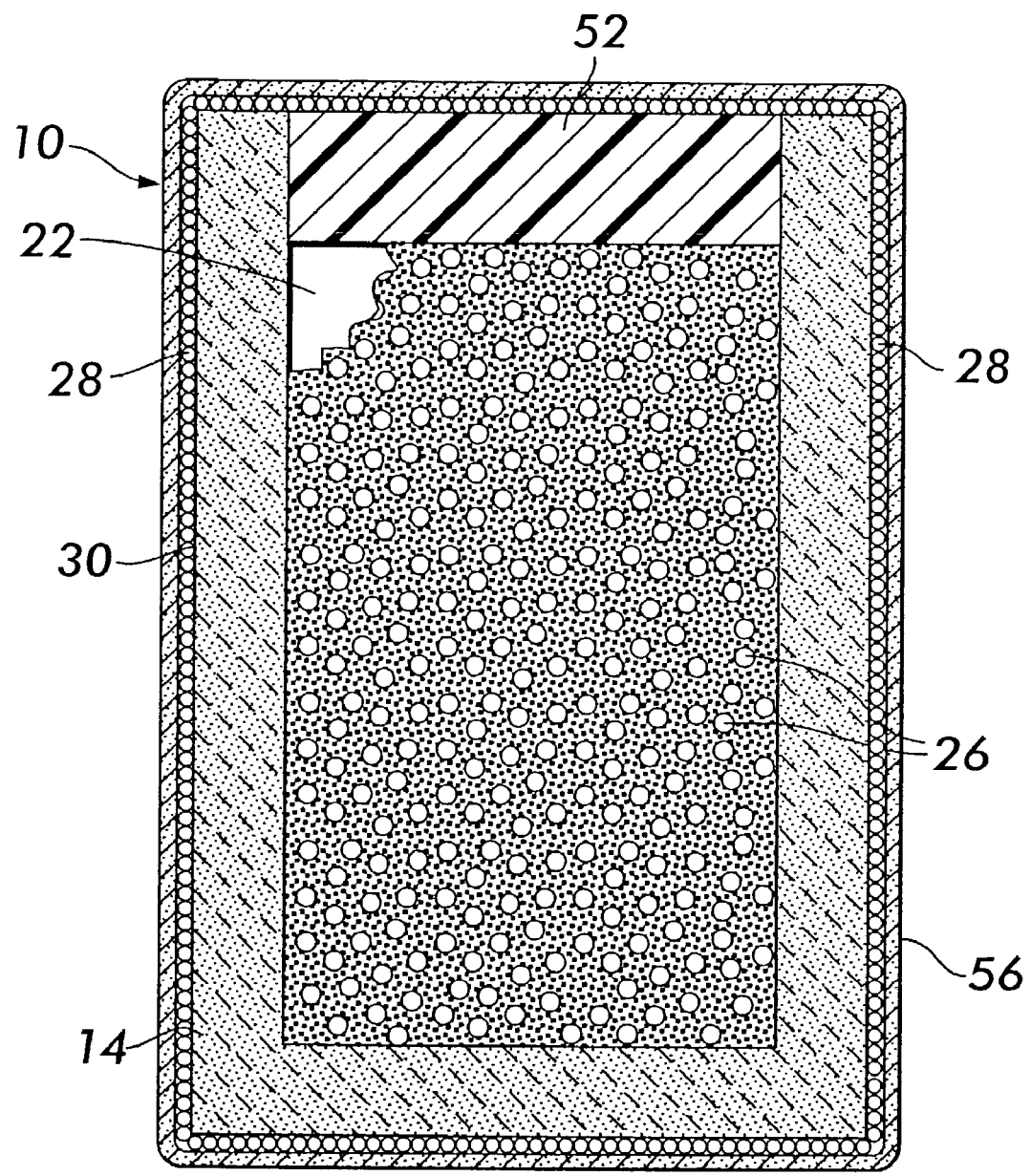
FIG. 6 is a cross sectional view of yet another embodiment of the present invention.

Shown if FIG. 6 is a means of adding poison control to a porous ceramic type container. Here a filter material 28 of $K_2CO_3$ is coated onto the outside of the container 14. The ceramic container is dipped in a water solution of dissolved filter material and then dried to leave a coating of filter material. The ceramic container is then wrapped in porous PTFE film 56 which acts as the microporous section 30. Other solvent soluble filter materials may be used as well.

Figure 7:
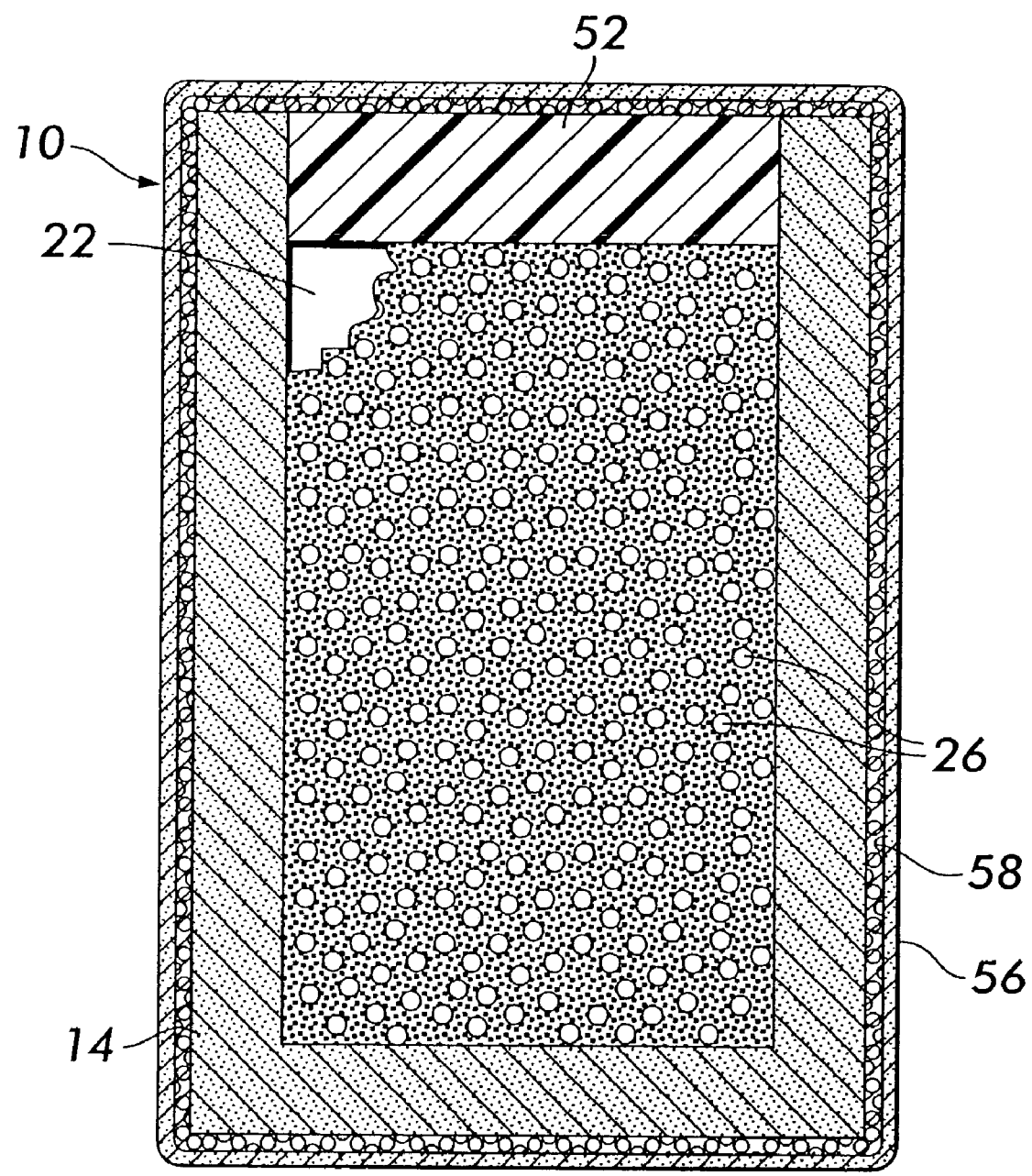
FIG. 7 is a cross sectional view of another embodiment of the present invention.

Shown if FIG. 7 is a means of adding filter material to any type container by a wrap. A film 58 impregnated with filter material is wrapped around the outside of the container 14 after it is loaded with catalyst 26 and the opening 20 sealed. This film could be laminated to the back of a porous PTFE film, or installed as a separate film which would require a separate porous PTFE film wrap 56 on top.

It is seen that an advantageous catalyst device is provided that can be simpler and less costly to produce than previously known devices. Moreover, poison and temperature control functions can be included. The invention also allows for greater flexibility in design of catalyst assemblies to fit a great number of cell designs. For example, the plastic container, whether non-porous or porous, has the advantage of allowing a flange to be added for easy attachment to a pressure relief vent and thereby eliminates the need for holders such as the cage holder even in embodiments where poison and temperature control are not desired. Moreover, the flange can be configured for the relief valve of a particular manufacturer.

Figure 8:
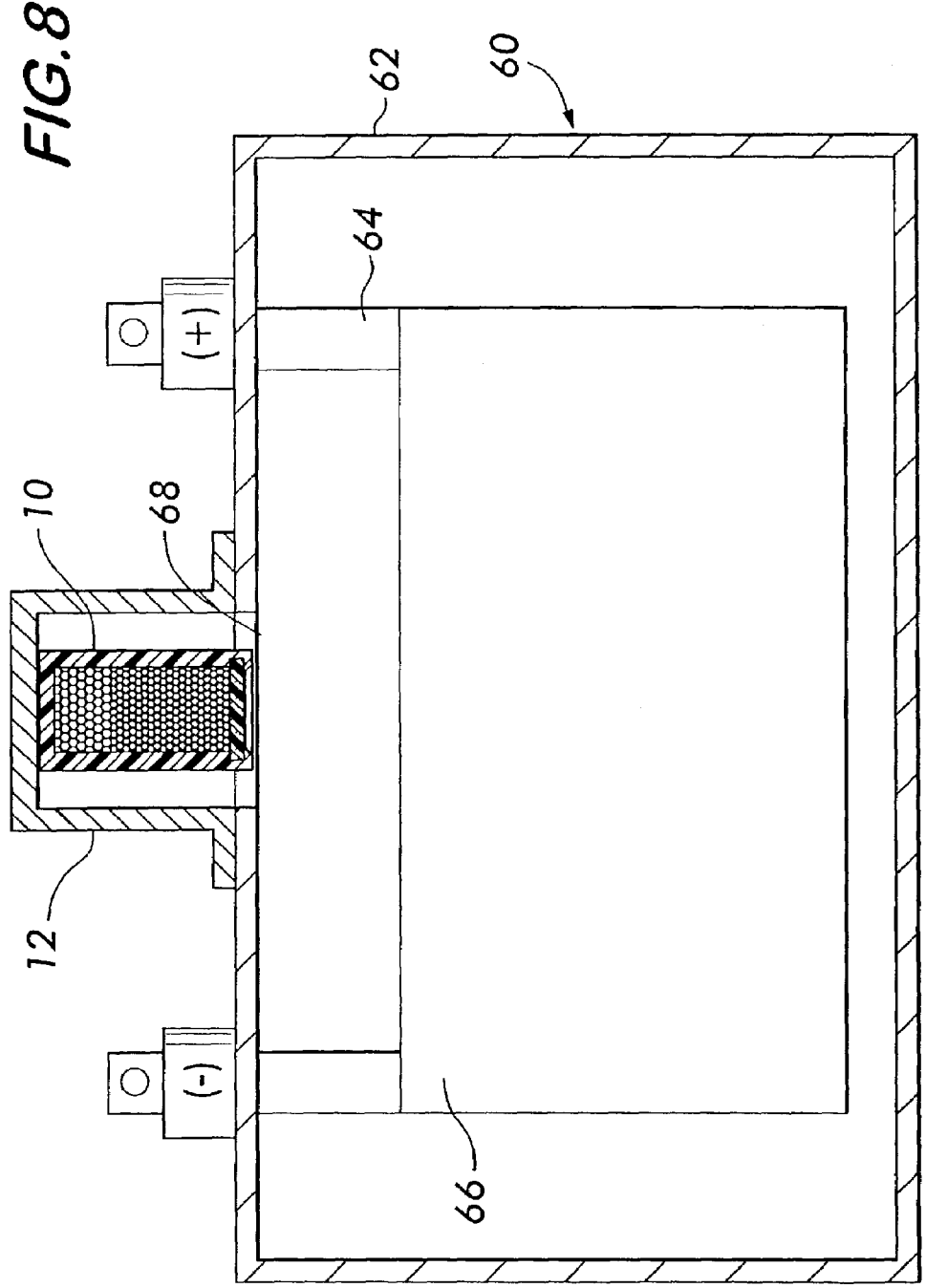
FIG. 8 is a schematic view of a VRLA battery cell in accordance with the present invention.

The catalyst device can be added to a battery cell by itself, attached to a pressure relief valve, or some other means of placing the catalyst in contact with the gasses within a battery cell. A VRLA cell 60 is schematically shown in FIG. 8 and has a sealed housing 62, a positive electrode 64 having active material, a negative electrode 66 having active material and which is in spaced relationship to said positive electrode, and an electrolyte in contact with the positive and negative electrodes (normally in the form of plates). The electrolyte may be contained in a separator means so that there is no "free" electrolyte in the cell. The VRLA cell is typically charged on a continuous basis and over a long-term, for example, in excess of five years. The word "continuous" as used herein in connection with the charging of the cell is intended to mean an uninterrupted flow of current, as well as an intermittent flow of current, for example, a pulsating current. A VRLA cell is typically charged at a voltage having a value that is slightly in excess of the value of the open-circuit voltage of the cell which, for example, is typically about 2.15 volts. The term "slightly in excess" means a value no greater than about 0.3 volt above the open circuit voltage of the cell in applications in which there is an intermittent flow of current. In applications in which the flow of current is uninterrupted during charging, it is preferred that the charge voltage have a value that is no greater than about 0.2 volt above the open-circuit voltage of the cell. As discussed above, the catalyst device 10 is ideally attached to the pressure relief valve 12 of the VRLA cell which is positioned in a gas space 68 within the housing where oxygen and hydrogen gas collect. The pressure relief valve 12 allows excess gas to escape the sealed housing and is preferably removable. Thus combining the catalyst device with the relief valve 12 makes the catalyst device removable while assuring it is in contact with the gas for recombination.

The pressure relief valve 12 of the VRLA cell 60 is a one-way valve, allowing gas to escape only from the battery to prevent over pressurization of the battery while preventing the ingress of gas from the outside or external environment of the battery. Thus it is seen that the catalyst 26 within the catalyst device 10 is in gas communication with the interior environment of the cell 60, while being isolated from the exterior environment outside the cell 60 such that gas from the exterior environment does not reach the catalyst.

Parameters and Considerations for Sizing Catalysts for VRLA Cells

It is believe that a standard AGM VRLA cells exhaust 100 ml/day/100 Ah of an oxygen hydrogen mixture at standard VRLA float charging voltages at 90° F. It is further believed that similar AGM VRLA cells with catalyst exhaust 20 ml/day/100 Ah of pure hydrogen (due to positive plate corrosion) at 90° F. Such gassing data indicates the catalyst must recombine 80 ml/day/100 Ah to keep the negative plates of a VRLA battery fully charged.

The minimum amount of Gas to be Combined: The largest AGM VRLA cell currently known to be produced is 1600 Ah. Faraday's law states that 1 Amp of current used to breakdown water into stoichiometric Hydrogen and Oxygen gas will produce 11.3 ml/min 2H$_2$–1O$_2$ at STP. Therefore the catalyst must recombine at most 0.079 amps of gas in a 1600 Ah AGM VRLA cell on float charge at 90° F. (1600 Ah/100 Ah)*(80 ml/day/100 Ah)/((11.3 m/min)*(60 min/hr)*(24 hr/day)).

The amount of gas produced by VRLA cells will change with the cell operating temperature based on Arhennius' equation. This equation shows that the volume of gas recombined by the catalyst will increase or decrease by approximately a factor of 2 for every 10° C. change in temperature. (10° C. rise in temperature will double the amount of gas needed to recombine (80 ml/day/100 Ah@32° C.=160 ml/day/100 Ah@42° C.))

VRLA cell manufacturers recommend VRLA cells be operated in a climate-controlled environment of 77° F., the 90° F. used for testing and the above data calculations represents a maximum recombination situation.

Heat Generation: The recombination reaction of oxygen and hydrogen to water will create 275 BTU/ft$^3$ of heat. (1 ft$^3$ of stoichiometric oxy-hydrogen=28310 ml of gas at STP). Therefore catalysts produce 0.073 BTU/min of heat for every 11.3 ml/min (1 amp) of stoichiometric oxy-hydrogen.

Maximum Steady State Operating Temperature: This 0.073 Btu/min/amp of heat is dissipated from the catalyst to the surroundings through a combination of heat flow release (conduction, convection, radiation). The micro porous disk of the 1 amp catalyst device 10 is specifically designed (by specifying pore size, surface area, thickness, etc.) to allow 11-12 ml/min stoichiometric oxy-hydrogen gas into the catalyst chamber and the resultant water vapor to diffuse out of the chamber. This specified gas flow rate generates the stated 0.073 BTU/min/amp of heat, which is dissipated by the catalyst to it's surroundings resulting in a steady state operating temperature of 120-140° F. measured at the outside surface of the catalyst chamber.

There is a similar heat generation to operating temperature relationship for the 0.25 amp catalyst device 10. The geometry of the 0.25 amp catalyst device allows between 3 and 6 ml of stoichiometric oxy-hydrogen into the catalyst with resultant water vapor exiting. The recombination of this amount of oxy-hydrogen generates 0.018 to 0.037 BTU/min of heat. This amount of heat generates a steady state operating temperature of 100-120° F. measured on the outside surface the 0.25 amp catalyst chamber.

The enthalpy generated by the catalyst reaction is a function of the stoichiometric oxy hydrogen gas flow rate through the micro porous membrane, the amount of catalytic material available to react with available gas and the packing density of the catalytic material inside the catalyst chamber.

The gas flow rate through the micro porous membrane is a function of membrane pore size, porosity, and surface area perpendicular to gas flow and is an inverse function of membrane thickness (defined as the length of the membrane perpendicular to gas flow).

An example of a properly sized micro porous membrane for this application is the preferred embodiment, using a micro porous PTFE disk with a surface area normal to gas flow of: 0.196 in$^2$, a pore size of 25 microns, a porosity of 15% and a thickness perpendicular to gas flow of 0.125 in. This size disk limits stoichiometric oxy-hydrogen gas flow to 10-15 ml/min, which limits the enthalpy generated by the catalyst embodiment to 0.064 BTU/min-0.090 BTU/min.

Regarding the filter material, the filters may have a finite life of limited capacity to absorb poisons. Thus over the life of the battery, a filter, or the container with the filter, may need to be replaced.

It is understood that the above-identified arrangements are merely illustrative of the many possible specific embodiments which represent applications of the present invention. Numerous and varied other arrangements can readily be devised in accordance with the principles of the invention without departing from the spirit and scope of the invention.

What is claimed is:

1. A valve regulated lead acid (VRLA) battery cell comprising:
   a sealed housing;
   a positive electrode positioned in the housing;
   a negative electrode positioned in the housing in spaced relationship from the positive electrode;
   an electrolyte in said housing in contact with said positive and negative electrodes;
   a gas space within said housing in which oxygen and hydrogen gas collects;
   a pressure relief valve which allows gas to escape from the housing and which prevents oxygen gas from outside the housing from entering said housing;
   a catalyst device which includes a container having a container wall and which defines an internal chamber, said catalyst device including a catalyst arranged within said internal chamber and which is capable of reacting oxygen gas and hydrogen gas to form water vapor, said catalyst device being arranged such that said catalyst is in fluid communication with said gas space and isolated from said oxygen gas outside of said housing; and a micro-porous section having pores through which said oxygen gas and hydrogen gas can pass into said internal chamber from outside of said container, said micro-porous section being capable of preventing liquid water from passing there through, said device being configured such that all fluid communication between said outside of said internal chamber and said internal chamber is by passage through said micro-porous section; and wherein at least one of the pore size, planar surface area and thickness of said micro-porous section is selected to control the amount or rate at which said oxygen and hydrogen gases can pass into said internal chamber to control the heat generated by the catalytic combination of said oxygen and hydrogen gases.

2. A battery cell in accordance with claim 1 wherein said micro-porous section is arranged in at least a portion of said container wall.

3. A battery cell in accordance with claim 1 wherein said micro-porous section has pores ranging in size between 1 and 40 microns.

4. A battery cell in accordance with claim 1 wherein said container is impervious to gas and water and has an opening to said chamber through which said fluid communication takes place, and wherein said micro-porous section comprises a micro-porous hydrophobic member arranged to seal said opening and which allows said hydrogen and oxygen gas to pass there through and which prevents liquid water from passing there through.

5. A battery cell in accordance with claim 1 wherein said container is made of a plastic material and is attached to a flange capable of being attached to said pressure relief valve.

6. A battery cell in accordance with claim 1 wherein said catalyst device further comprises a catalyst poison filter arranged within said chamber to remove at least a portion of catalyst poisons in said oxygen and hydrogen gas.

7. A battery cell in accordance with claim 2 wherein said poison filter comprises potassium.

8. A device for use with a VRLA battery which battery has a housing defining an internal and an external environment, said device comprising:
    a catalyst container having a container wall and defining an internal chamber;
    a catalyst arranged within said chamber, said catalyst capable of reacting oxygen gas and hydrogen gas to form water vapor;
    a micro-porous section having pores through which said oxygen gas and hydrogen gas can pass into said internal chamber from outside of said container, said micro-porous section being capable of preventing liquid water from passing therethrough, said device being configured such that all fluid communication between said outside of said internal chamber and said internal chamber is by passage through said micro-porous section; and wherein at least one of the pore size, planar surface area and thickness of said micro-porous section is selected to control the amount or rate at which said oxygen and hydrogen gases can pass into said internal chamber to control the heat generated by the catalytic combination of said oxygen and hydrogen gases; and
    a pressure relief valve which allows gas to escape from the battery and which prevents gas from the external environment from entering the battery, said catalyst container being attached to said pressure relief valve; said container being arranged such that said catalyst is capable of receiving said hydrogen and oxygen gases through said micro-porous section from said internal environment of said battery and not from said external environment when said device is in combination with said battery.

9. A device in accordance with claim 8 wherein said catalyst container is attached to said pressure relief valve by a flanged connection.

10. A catalyst device for combining gases within a storage battery; comprising:
    a catalyst capable of reacting oxygen gas and hydrogen gas to form water vapor;
    a catalyst container within which said catalyst is disposed, said container being impervious to gas and water and having an opening which is the only path for fluid communication between an outside of said container and catalyst; and
    a micro-porous member disposed to close said opening so as to control said fluid communication through said opening, said micro-porous member having pores through which said oxygen and hydrogen gases and water vapor can pass but through which liquid water cannot pass, wherein at least one of the pore size, planar surface area and thickness of said micro-porous member is selected to control the amount or rate at which said oxygen and hydrogen gases can pass through said micro-porous member to said catalyst so as to control the rate of the catalytic combination of said oxygen and hydrogen gases.

11. A catalyst device for combining gases within a storage battery in accordance with claim 10 wherein said container is cylindrical, and said opening comprises a single opening disposed at an end of said container.

12. A VRLA battery having a catalyst device in accordance with claim 10, said battery comprising:
    a sealed housing defining an internal environment within said housing and an external environment outside said housing;
    an electrolyte disposed in said housing;
    positive and negative plates disposed in said housing and in contact with said electrolyte;
    a gas space in said internal environment in which said oxygen and hydrogen gases collect;
    a pressure relief valve which prevents gas from said external environment from entering said internal environment; and
    wherein said catalyst device is arranged so that said catalyst is in fluid communication with only said gas space.

13. The device of claim 11 in combination with a storage battery that has a housing defining an internal and external environment, wherein said container is arranged such that said catalyst is capable of receiving said hydrogen and oxygen gases from said internal environment of said battery and not from said external environment when said device is in combination with said battery.

14. A device for combining gases within a storage battery; comprising:
    a catalyst container having a container wall and defining an internal chamber;
    a catalyst arranged within said chamber, said catalyst capable of reacting oxygen gas and hydrogen gas to form water vapor;
    a micro-porous section having pores through which said oxygen gas and hydrogen gas can pass from outside of said internal container into said internal chamber, said micro-porous section being capable of preventing liquid water from passing there through, said device being configured such that all fluid communication between said outside of said internal chamber and said internal chamber is by passage through said micro-porous section; and wherein at least one of the pore size, planar surface area and thickness of said micro-porous section is selected to control the amount or rate at which said oxygen and hydrogen gases can pass into said internal chamber to control the heat generated by the catalytic combination of said oxygen and hydrogen gases.

15. A device in accordance with claim 14 wherein said micro-porous section is arranged in at least a portion of said container wall.

16. A device in accordance with claim 14 wherein said container comprises a plastics material.

17. A device in accordance with claim 14 wherein said micro-porous section has pores ranging in size between 1 and 40 microns.

18. A device in accordance with claim 14 wherein said container wall is substantially non-porous to gas and liquid and said container has an opening to said chamber through which all fluid communication between said outside of said internal chamber and said internal chamber takes place, and wherein said micro-porous section comprises a micro-porous hydrophobic member arranged in relation to said opening such that all fluid communication between said outside of said internal chamber and said internal chamber passes through said micro-porous member.

19. A device in accordance with claim 14 further comprising a pressure relief valve.

20. A device in accordance with claim 14 wherein said container is made of a plastic material and is attached to a flange capable of attaching to a pressure relief valve.

* * * * *